Patented Mar. 10, 1953

2,631,128

UNITED STATES PATENT OFFICE 2,631,128

DRILLING FLUIDS AND METHODS OF USING THE SAME

Rufus V. Jones, Bartlesville, Okla., assignor to Phillips Petroleum Company, a corporation of Delaware No Drawing. Application April 24, 1950,
Serial No. 157,850

18 Claims. (Cl. 252—8.5)

This invention relates to drilling fluids. In one of its aspects, it relates to a drilling fluid comprising an aqueous solution of an alkali metal polyvinyl sulfate. In another of its aspects, it relates to a method for the use of such an alkali metal polyvinyl sulfate for controlling the viscosity, gel strength, water loss and filter cake thickness of a well drilling fluid.

In the art of drilling wells, especially that of drilling wells by the rotary method, it is necessary to use a drilling fluid or drilling mud as is well understood in the art. In forming such a drilling fluid, the procedure employed in the field for some years has been to start the drilling operation by circulating water through the drill string as the drilling fluid. The circulated water then picks up clayey materials and other suspended solids as the drilling operation penetrates into the earthen strata. Then, this natural mud laden fluid is varied and controlled with the then existing demands for various properties thereof by adding certain materials, as desired, and by removing solids at the surface of the bore hole in a settling zone, commonly designated as a "mud pit." One of the materials added to the drilling fluid is ordinarily bentonite, which, as is well understood in the art, is a clay-type material having the property of swelling when contacted with water. The swelled bentonite is dispersed in the mud in the form of a colloidal suspension and carries upon its surface electrical charges, which charges largely determine the characteristics of the drilling mud suspension. Other materials or additives are added to the drilling fluid in order to control the various properties thereof so that it can perform a multiplicity of functions.

One of these functions is to cool and lubricate the drill stem and the drill bit. Another function is to carry the earthen cuttings derived from the drilling operation out of the bore hole. To perform such function, the drilling fluid must have a viscosity which is low enough that it can readily be pumped and yet high enough that it can suspend cuttings from the drilling operation therein and prevent their settling while the fluid is being passed from the bore hole. In addition, the viscosity of the drilling fluid must be such that the suspended cuttings can be settled therefrom during a suitable period of time in the mud pit. The drilling fluid performs the additional function of providing a filter cake on the walls of the bore hole to at least partially prevent the loss of fluid, particularly water, from the drilling fluid into any porous formations adjacent the bore hole. If such water loss were not prevented, there would result a thick filter cake adjacent the porous formations encountered during the drilling operation with the result that local areas of very thick filter cake, i. e., "choking rings," would be built up on the walls of the bore hole thereby tending to bind the rotating drill string and to prevent circulation of drilling fluid through the well. Excessive water loss also results in the intrusion of water and mud into adjacent oil sands thereby driving back the oil from the bore hole and causing the porosity of the oil sand to be reduced to such an extent that the oil flow from the oil sand into the bore hole is prevented. Also high water loss will cause any bentonitic formations or the like to swell and heave with the result that such formations are sloughed into the bore hole, thereby unduly ladening the drilling fluid with suspended solids and, in extreme cases, preventing further circulation of the drilling fluid or further rotation of the drilling string. Still further, high water losses result in the loss of clay and treating chemicals from the drilling fluid and in the loss of water, which, in many dry regions, must be transported for many miles to the drilling site.

Still another function of the drilling fluid is to hold the cuttings derived from the drilling operation in suspension when the drilling operation is stopped for any particular reason. Ordinarily, circulation of the drilling fluid ceases upon each trip of the drilling string out of and into the well. Accordingly, the drilling fluid must have certain thixotropic properties which permit it to set into a gel capable of holding the cuttings in suspension upon cessation of the circulation of the drilling fluid in order to prevent the cuttings from settling to the bottom of the well where they would prevent rotation of the bit and would prevent circulation of the drilling fluid. Further, the drilling fluid must have the complementary thixotropic property of reverting from its gelled state to a pumpable fluid upon resumption of the drilling operation.

The principal object of this invention is to provide a drilling fluid which can be used in substantially all formations and which will have a reduced water loss, a thin filter cake, and proper viscosity and gel strength.

Another object is to provide an improved drilling fluid.

Another object is to provide an improved method of drilling.

Still another object is to provide a drilling fluid additive which can be incorporated into a drilling fluid to insure that such drilling fluid will have the desirable characteristics of low water loss, a proper gel strength and viscosity and a thin filter cake.

Another object of this invention is to provide a drilling fluid containing an alkali metal polyvinyl sulfate adapted to regulate and control the drilling properties of such fluid.

Various other objects, advantages and features of the invention will become apparent from the following detailed description.

In the present invention in order to realize these and other objects, it is preferred to employ in a drilling fluid an alkali metal polyvinyl sulfate. Such a compound is a polymer comprising units having the general formula $$R(OH)_{(1-n)}(OSO_3X)_n$$

wherein R represents the vinyl alcohol nucleus,

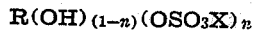

X represents an alkali metal atom such as sodium, potassium or lithium, and $n$ is the average number of sulfate units per vinyl alcohol unit in the treated vinyl alcohol molecule. Vinyl alcohol units,

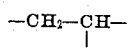

can be joined together to form polyvinyl alcohol which has the general formula

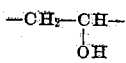

wherein there is shown two vinyl alcohol molecules joined together. Additional vinyl alcohol molecules can be joined to those shown at the available bonds at each end of the illustrated formula.

The alkali metal polyvinyl sulfate of this invention can be prepared by any suitable method but a very convenient manner of preparation is to react polyvinyl alcohol with a pyridine-sulfur trioxide complex in the presence of an ion-yielding material such as sodium chloride. This method of preparation is more fully described and claimed in my copending application, Serial No. 112,402, filed August 25, 1949, and the description contained therein for the preparation of these compounds is incorporated by reference into this application. Thus as described in said copending application Serial No. 112,402, one mol of polyvinyl alcohol is reacted with 1 to 10 mols, preferably 2 to 6 mols of sulfating agent selected from the group consisting of compounds of sulfur trioxide with pyridine, dioxane, dimethyl aniline, or $\beta,\beta'$-dichlorodiethylether; 0.5 to 1.5 mols, preferably 1 mol of alkali metal halide per mol of sulfating agent; and 1 to 50 mols of a tertiary amine such as pyridine, picolines, other alkyl pyridines, and quinoline; at a temperature of 104 to 239° F. preferably 176 to 212° F., for a reaction time of 2 to 14 hours. For example as described in said application, 1 mol of pyridine sulfur trioxide complex, 1 mol of polyvinyl alcohol, 1 mol of sodium chloride, and 3.2 mols of pyridine were heated together for eight hours at 100° F. Following removal of pyridine, the product was washed with methanol, pulverized with methanol, dispersed in water and filtered. The filtrate was poured into a large volume of methanol and the resulting precipitate separated by centrifuging and then extracted with methanol till free of chloride ions. The resulting 67 g. of polyvinyl sulfate had a sulfur content of 16.34 per cent and a sodium content of 13.8 per cent representing a degree of substitution of 0.46.

The number of sulfate groups introduced into the polyvinyl alcohol molecule is variable and will depend upon the specific reaction conditions employed and can be varied to suitably change the properties of the alkali metal polyvinyl sulfate product. The average number of sulfate groups per vinyl alcohol unit present in the sulfated polyvinyl alcohol molecules is expressed as the degree of substitution. In the practice of this invention, it is preferred to employ an alkali metal polyvinyl sulfate having a degree of substitution within the range of 0.2 to 0.6, although higher or lower values, say 0.1 to 1.0 can be used when desired.

The amount of alkali metal polyvinyl sulfate employed in the drilling fluid can be varied considerably as even small amounts are effective, although to a correspondingly small degree. However, as a general rule, the amount of the alkali metal polyvinyl sulfate employed will ordinarily fall within the range of 1 to 10 pounds per barrel (42 gallons) of drilling fluid but as will be well understood by those skilled in the art, the exact amount of the alkali metal polyvinyl sulfate employed to yield the desired properties of the drilling fluid can be varied from time to time and from well to well in accordance with existing conditions. In order to determine the optimum amount of alkali metal polyvinyl sulfate to be added to any particular drilling fluid under any given set of conditions, it is merely necessary, as is the common practice when employing all types of drilling fluid additives, to withdraw a portion of the drilling fluid and to test it with various amounts of the alkali metal polyvinyl sulfate incorporated therein in order to determine the exact amount necessary to yield the desired properties of a drilling fluid and to avoid employing costly excesses of such additive.

The drilling fluids to which the concept of this invention is applicable include not only those which are derived by circulating water through a well to pick up natural clays and other materials from the earthen formations being drilled, but also to fluids synthetically prepared by adding any one or more of a variety of clayey materials and/or other additives to water. Such fluids can comprise, for example, bentonite colloidally dispersed in either fresh or salt water and containing, if desired, various other clays, such as kaolin, as well as commonly used modifying agents such as quebracho, caustic and polyphosphate. Further, the drilling fluids of this invention include those which contain dispersed hydrocarbon oils therein or which consist of a hydrocarbon oil as the fluid component, i. e., oil base drilling fluids, which are well known to the art.

TESTS

Drilling fluids containing the water soluble alkali metal polyvinyl sulfate additives of this invention were tested with standard drilling fluid laboratory equipment and in accordance with the standardized procedure set forth in A. P. I. Code 29. The measurements of the pH were made with a Beckman "Industrial Model M" pH meter. The viscosity measurements were made with a Stormer viscosimeter 1931 model manufactured by Arthur H. Thomas Company. The mixing of the samples was for a period of 15 minutes in each case employing a Hamilton Beach No. 33 high speed mixer. The water losses were determined with "A. P. I. low pressure wall building tester filter press" with a pressure of 100 pounds per square inch gauge applied for 30 minutes. All temperatures were approximately room temperature i. e., 75° F. All barrels were 42 U. S. gallon barrels.

Example I

Sodium polyvinyl sulfate having an average degree of substitution of 0.46 sodium sulfate groups per vinyl alcohol unit was prepared by the interaction of polyvinyl alcohol with a pyridine-sulfur trioxide complex in the presence of sodium chloride. This product was tested in a laboratory prepared mud composed of 20 per cent kaolin, two per cent bentonite, 17.5 per cent barium sulfate, and 60.5 per cent water. Varying amounts of salt were added and the tests run according to the methods described in the preceding paragraph. The results were as shown in the following table:

LOW CALCIUM MUD

| Sodium Polyvinyl Sulfate, Pounds Per Barrel | Viscosity, Centipoises | Gel Strength, Gms. | | Water Loss, ml. | pH |
|---|---|---|---|---|---|
| | | Initial | 10 min. | | |
| 0 | 14 | 0 | 7 | 19.5 | 7.5 |
| 1 | 22 | 3 | 4 | 10.0 | 7.5 |
| 2 | 35 | 5 | 5 | 10.0 | 7.4 |
| 4 | 58 | 10 | 10 | 7.0 | 7.2 |

Example II

A sodium polyvinyl sulfate having an average degree of substitution of 0.6 sodium sulfate groups per vinyl alcohol unit was prepared by the interaction of polyvinyl alcohol with anhydrous sodium chlorosulfonate in the presence of pyridine. This product was tested in a laboratory prepared mud composed of 20 per cent kaolin, two per cent bentonite, 17.5 per cent barium sulfate, and 60.5 per cent water. Varying amounts of the salt were added and the tests were run according to the methods described hereinbefore. The results were as shown in the following table:

LOW CALCIUM MUD

| Sodium Polyvinyl Sulfate, Pounds Per Barrel | Viscosity, Centipoises | Gel Strength, Gms. | | Water Loss, ml. | pH |
|---|---|---|---|---|---|
| | | Initial | 10 min. | | |
| 0 | 14 | 0 | 7 | 19.5 | 7.5 |
| 1 | 22 | 3 | 4 | 9.8 | 7.1 |
| 2 | 37 | 2 | 7 | 8.0 | 6.8 |
| 4 | 89 | 10 | 23 | 8.5 | 6.5 |

Example III

In a series of runs with a high calcium mud, the following data were obtained using sodium polyvinyl sulfates of different average degrees of substitution:

| Water Used | Sodium Polyvinyl Sulfate, Pounds per Barrel | Deg. Subs. | Viscosity, Centipoises | Gel Strength, gms. | | Water Loss, ml. | pH |
|---|---|---|---|---|---|---|---|
| | | | | Initial | 10 Min. | | |
| Fresh | 0 | 0.46 | 11 | 15 | 15 | 57 | 7.9 |
| Do | 2 | 0.46 | 9 | 5 | 12 | 17.5 | 7.9 |
| Do | 4 | 0.46 | 18 | 8 | 15 | 10.5 | 7.9 |
| Do | 2 | 0.6 | 10 | 12 | 15 | 16.5 | 7.7 |
| Do | 4 | 0.6 | 17 | 2 | 7 | 11 | 7.6 |
| Salt | 0 | 0.46 | 13 | 18 | 17 | 55 | 7.7 |
| Do | 2 | 0.46 | 13 | 14 | 15 | 29 | 7.7 |
| Do | 4 | 0.46 | 20 | 17 | 19 | 18 | 7.7 |
| Do | 2 | 0.6 | 16 | 18 | 19 | 22 | 7.6 |
| Do | 4 | 0.6 | 22 | 16 | 17 | 15 | 7.5 |

It is understood that while certain theories have been advanced in the explanation of this invention, they are not the only or necessary ones but have been advanced only to facilitate the disclosure. Moreover, it is to be understood that this invention is not intended to be limited by any theories. It is further obvious that various changes or modifications can be made in the details disclosed herein without departing from the spirit of the invention nor from the scope of the invention defined by the following claims. Obviously, use of the aqueous mud laden fluid includes use in the aqueous phase of an emulsion or in mixtures of a non-aqueous material. It is to be understood that the invention is not to be limited to the specific details herein which were given for illustrative purposes. Tests with treating and control agents indicate that the alkali metal polyvinyl sulfates of this invention are inert chemically and that all the normal and usual treating and control agents of the well drilling fluid and well controlling fluid acts may, after a mere routine test for lack of obvious adverse reactions, be employed without invention in the drilling and controlling fluids of this invention, and that with few, if any, exceptions they will be so employable.

While the invention has been described in connection with a present, preferred embodiment thereof, it is to be understood that this description is illustrative only and is not intended to limit the invention, the scope of which is defined by the appended claims.

I claim:

1. A water base drilling mud comprising in combination, sufficient water to maintain the mud as a fluid, sufficient clayey material to form a filter cake on the wall of the well and a water soluble alkali metal polyvinyl sulfate in an amount sufficient to reduce the water loss due to filtration through said filter cake without increasing the viscosity of said well drilling fluid to such an extent that it cannot be circulated.

2. A water base drilling mud comprising an aqueous fluid mixture containing suspended solids which form a filter cake on the wall of the well and a water soluble alkali metal polyvinyl sulfate in an amount sufficient to reduce the water loss through said filter cake without increasing the viscosity of said well drilling fluid to such an extent that it cannot be circulated.

3. A water base drilling mud comprising in combination, sufficient water to maintain the mud as a fluid, sufficient clayey material to form a filter cake on the wall of the well and a water soluble sodium polyvinyl sulfate in an amount sufficient to reduce the water loss due to filtration through said filter cake without increasing the viscosity of said well drilling fluid to such an extent that it cannot be circulated.

4. A water base drilling mud comprising an aqueous fluid mixture containing suspended solids which form a filter cake on the wall of the well and a water soluble sodium polyvinyl sulfate in an amount sufficient to reduce the water loss through said filter cake without increasing the viscosity of said well drilling fluid to such an extent that it cannot be circulated.

5. A water base drilling mud comprising in combination, sufficient water to maintain the mud as a fluid, sufficient clayey material to form a filter cake on the wall of the well and a water soluble potassium polyvinyl sulfate in an amount sufficient to reduce the water loss due to filtration through said filter cake without increasing the viscosity of said well drilling fluid to such an extent that it cannot be circulated.

6. A water base drilling mud comprising an aqueous fluid mixture containing suspended solids which form a filter cake on the wall of the well and a water soluble potassium polyvinyl sulfate in an amount sufficient to reduce the water loss through said filter cake without increasing the viscosity of said well drilling fluid to such an extent that it cannot be circulated.

7. A water base drilling mud comprising in combination, sufficient water to maintain the mud as a fluid, sufficient clayey material to form a filter cake on the wall of the well and a water soluble lithium polyvinyl sulfate in an amount sufficient to reduce the water loss due to filtration through said filter cake without increasing the viscosity of said well drilling fluid to such an extent that it cannot be circulated.

8. A water base drilling mud comprising an aqueous fluid mixture containing suspended solids which form a filter cake on the wall of the well and a water soluble lithium polyvinyl sulfate in an amount sufficient to reduce the water loss through said filter cake without increasing the viscosity of said well driling fluid to such an extent that it cannot be circulated.

9. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble alkali metal polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

10. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble sodium polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

11. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble potassium polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

12. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble lithium polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

13. In a process for drilling a well with well drilling tools wherein there is circulated in the well a water base drilling mud containing solid particles suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble alkali metal polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

14. In a process for drilling a well with well drilling tools wherein there is circulated in the well a water base drilling mud containing solid particles suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble sodium polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

15. In a process for drilling a well with well drilling tools wherein there is circulated in the well a water base drilling mud containing solid particles suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble potassium polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

16. In a process for drilling a well with well drilling tools wherein there is circulated in the well a water base drilling mud containing solid particles suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble lithium polyvinyl sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

17. A drilling mud according to claim 2 wherein said water soluble alkali metal polyvinyl sulfate has a degree of substitution within the range of 0.2 to 0.6.

18. A process according to claim 13 wherein said water soluble alkali metal polyvinyl sulfate has a degree of substitution within the range of 0.2 to 0.6.

RUFUS V. JONES.

REFERENCES CITED

The following references are of record in the file of this patent:

UNITED STATES PATENTS

| Number | Name | Date |
|---|---|---|
| 443,069 | Chapman | Dec. 16, 1890 |
| 2,145,345 | Dreyfus | Jan. 31, 1939 |
| 2,364,434 | Foster | Dec. 5, 1944 |
| 2,395,347 | Sharkey | Feb. 19, 1946 |
| 2,425,768 | Wagner | Aug. 19, 1947 |
| 2,489,521 | Carlson | Nov. 29, 1949 |

OTHER REFERENCES

Kainer, Polyvinylalkohole, pgs. 32, 145 and 146, pub. 1949, Ferdinand Enke Verlag Stuttgart.